March 12, 1957  S. BAKEWELL  2,784,950
MIXING MACHINE

Filed May 19, 1954  4 Sheets-Sheet 1

INVENTOR.
SIDNEY BAKEWELL.
BY Robert A. Sloman
ATTORNEY

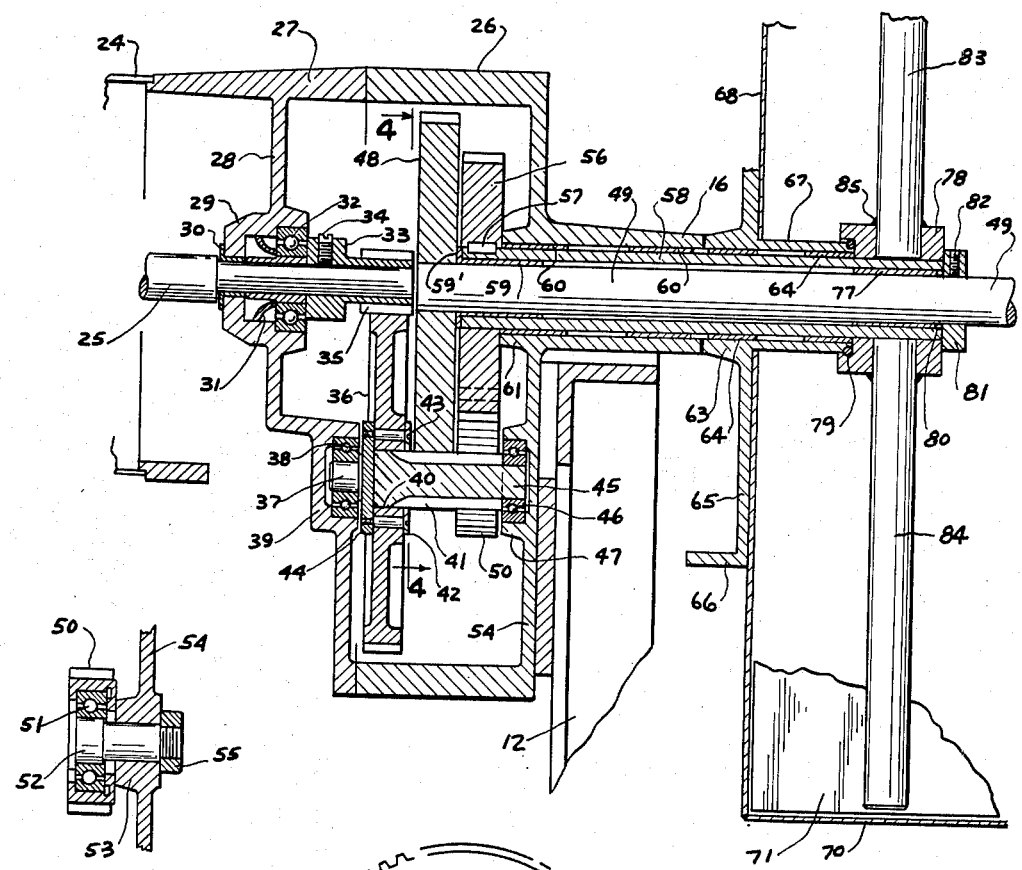
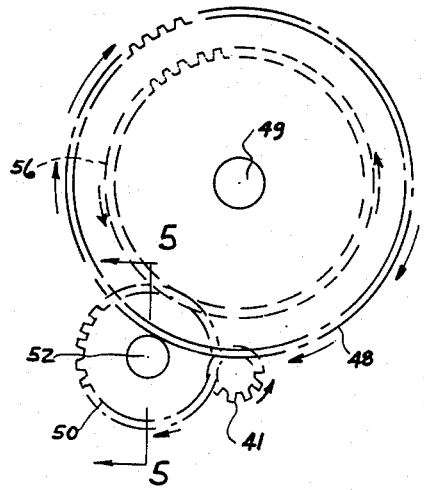

March 12, 1957

S. BAKEWELL 2,784,950

MIXING MACHINE

Filed May 19, 1954

INVENTOR.
SIDNEY BAKEWELL.

BY Robert A. Sloman

ATTORNEY

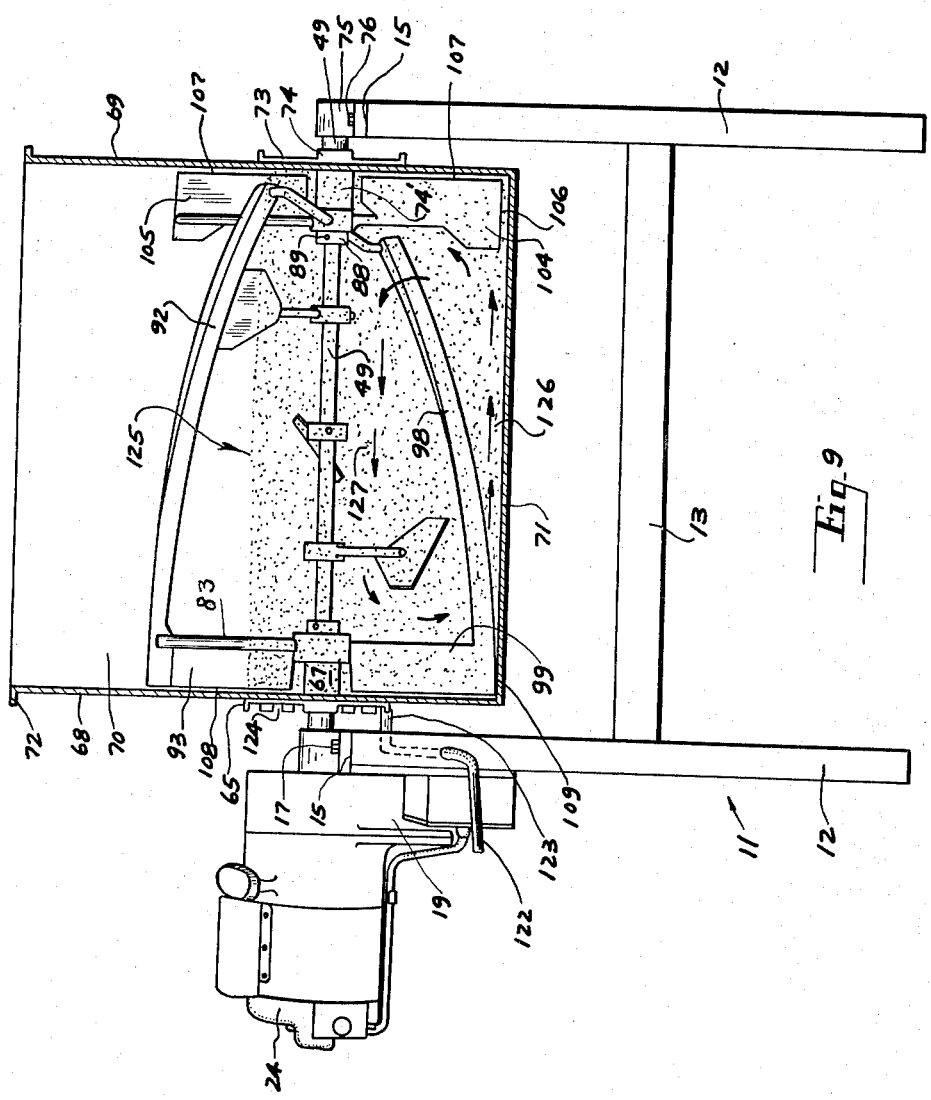

United States Patent Office 2,784,950
Patented Mar. 12, 1957

2,784,950

MIXING MACHINE

Sidney Bakewell, Detroit, Mich.

Application May 19, 1954, Serial No. 430,887

1 Claim. (Cl. 259—105)

This invention relates to a mixing machine, and more particularly to a mixing device for chopped meats or other foods, particularly meats.

It is the object of the present invention to provide a mixing machine whereby foods may be fully and completely mixed without crushing or mutilating, or heating.

It is the further object of this invention to provide a highly efficient mixing machine particularly useful in large institutions such as hotels, restaurants and hospitals or by meat markets and sausage manufacturers, where large amounts of meat must be mixed and seasoned quickly.

It is the further object of the present invention to provide a mixing machine which has a gentle mixing action upon the food particles to be mixed and which is so constructed as to move the material to be mixed longitudinally first in one direction throughout substantially the length of the mixing tank and to thereafter effect a movement thereof in the opposite direction.

These and other objects will be seen from the following specification and claim in conjunction with the appended drawings, in which:

Fig. 3 is an enlarged fragmentary section taken on line 3—3 of Fig. 2.

Fig. 4 is a fragmentary section taken on line 4—4 of Fig. 3.

Fig. 5 is a section taken on line 5—5 of Fig. 4.

Fig. 9 is a longitudinal section taken on line 9—9 of Fig. 7.

Figure 1:
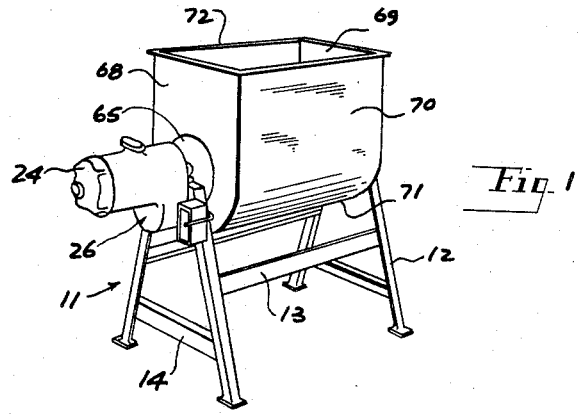
Fig. 1 is a perspective view of the present mixing machine.

It will be understood that the above drawings illustrate merely a preferred embodiment of the invention, and that other embodiments are contemplated within the scope of the claim hereafter set forth.

Referring to the drawings, the present mixing machine, which is particularly adapted for the mixing of chopped meats, consists of an upright support 11 including legs 12 and reinforcing cross braces 13 and 14.

The pairs of legs at opposite ends of the device terminate at their upper ends in the support plates 15, over which is positioned the bearing support 16 of gear casing 26 and which is secured to said plate by the bolts 17.

Figure 2:
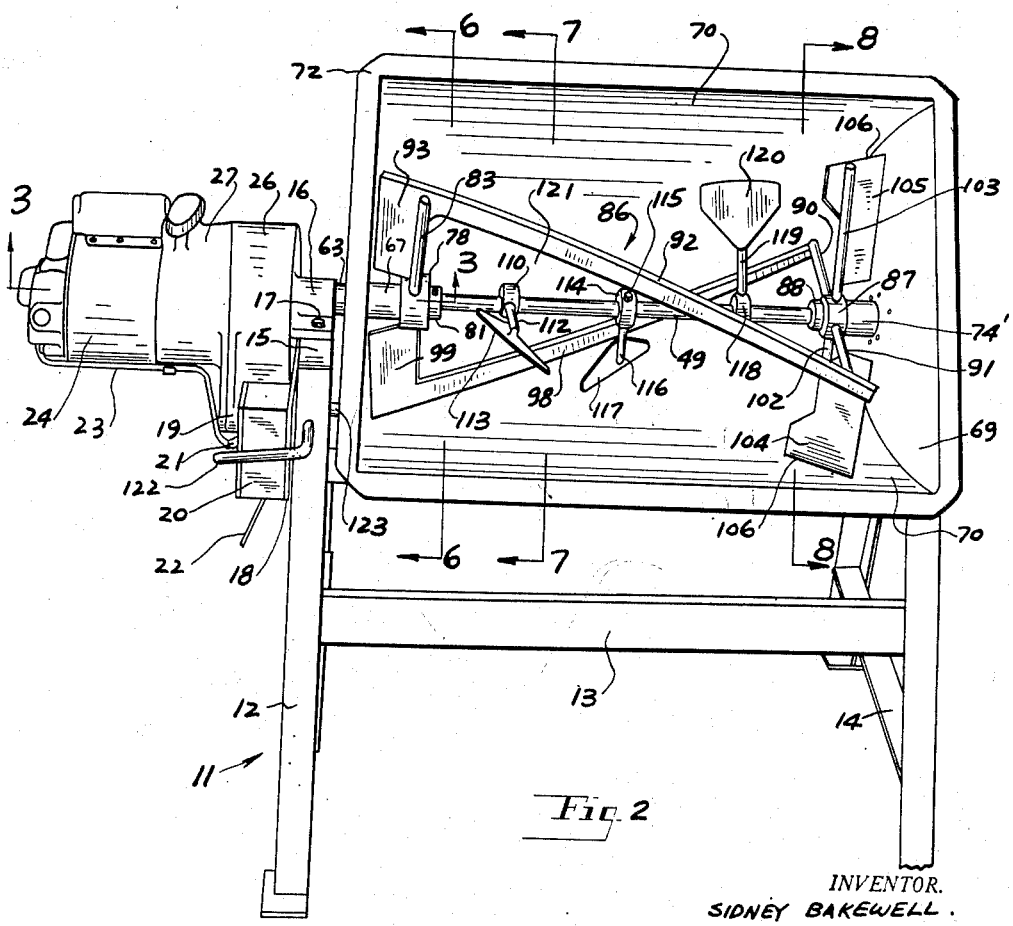
Fig. 2 is a perspective view on an enlarged scale with the mixing tank rotated, for illustration of the mixing blades.

Across the upper ends of one set of legs there is also provided as shown in Fig. 2 an upright plate 18 from which is spaced lower portion 19 of said gear casing 26. There is also mounted upon said plate switch housing 20 for toggle switch 21 for turning "off" and "on" electric motor 24, there being lead wire 22 joining an electrical power source connected to said switch, and said switch being further connected with said motor by the wire conduit 23.

As further shown in Figs. 2 and 3, gear casing 26 has a cover 27 including a transverse webbing 28 which has a central hub 29, mounting bushing 30, oil seal 31 and bearings 32 through which axially extends the outer end of the drive shaft 25 of motor 24. There is a spacing shoulder 33 on shaft 25 with set screw 34, as part of helical drive pinion 35 secured upon the outer end of shaft 25 within gear casing 26 and is in mesh with the fibre gear 36. Collar 33 acts as a stop against bearing 32 taking up the longitudinal thrust of helical gear 35. Gear 36 centrally apertured at 40 is secured by screws 43 to plate 44 on pinion 41 from which projects mounting journal 37. Element 37 is journaled within bearings 38 nested within a recess formed in hub 39 formed in webbing 28 of gear case cover 27.

Elongated drive pinion 41 is projected into gear recess 40 and immovably secured to gear 36 for rotation therewith, the opposite end of pinion 41 as at 45 being journaled within bearings 46 in hub 47 on web 54 of gear casing 26.

Plate 42 snugly receives pinion 41 and is also secured to gear 36 by the aforesaid screws 43.

Driven gear 48 is secured upon elongated shaft 49 within gear casing 26, in the manner hereafter described, and is in mesh with drive pinion 41. There is provided idler pinion 50 carrying bearings 51 journaled upon stud shaft 52 which projects into boss 53 on webbing 54 and is secured thereto by the nut 55.

Said idler gear is in mesh with a second driven gear 56 within said gear casing, which is keyed as at 57 to the elongated tube 58.

Tube 58 is concentric with shaft 49 and mounted thereover with one end of said tube extending into said gear casing, there being a suitable thrust bushing 59 interposed between tube 58 and shaft 49, and with the flange of said bushing as at 59' serving as a spacer between gears 48 and 56.

Tube 58 is rotatably journaled within spacing boss 61 formed upon the interior of web 54, there being a corresponding outwardly projecting boss 16 upon the exterior of web 54. Tube 58 is journaled within bosses 61 and 16, there being suitable bushings 60 within said bosses and receiving tube 58.

Tube 58 is journaled through bushing 64 within boss 63 projecting outwardly of reinforcing plate 65 secured upon the upright end wall 68 of the mixing hopper shown in Figs. 1 and 2.

Said hopper includes the spaced upright end walls 68 and 69 and the spaced upright side walls 70, the lower portions of which terminate in a semi-circular formation as at 71. The end and side walls terminate at their upper ends in an outwardly directed flange 72 which thereby defines the inlet opening for said hopper.

Shaft 49 extends through the hopper and through the bosses 74 and 74' on the end plate 73 secured upon the exterior of end wall 69. The outer end of shaft 49 is journaled within bearing 75 secured as at 76 to the top plate 15 of the end pair of legs 12 of the machine support.

Thus it appears that the elongated shaft 49 is journaled within rotatable tube 58, at side wall 68, the outer end of tube 58 journaling a portion of shaft 49 with bushing 77 interposed. Secured to the outer end of tube 58 is driving hub 78 to which is secured one set of meat mixing blades in the manner hereafter described. From the present gear relationship within the gear casing, shaft 49 will rotate in one direction and tube 58 will rotate in the opposite direction, shaft 49 also driving a second set of mixing paddles hereafter described.

Tube 58 projects into hopper 68—69—70, being journaled within bushing 64 upon the interior of hub 63 of reinforcing plate 65 secured to hopper end wall 68, said plate 65 having an annular flange 66.

Hub 63 has a cylindrical projection 67 which extends into said hopper through which also projects tube 58 with a suitable bushing 64 being interposed between said tube and said sleeve. Tube 58 is furthermore journaled upon bushing 77 interposed between shaft 49 and tube 58, the end of said tube carrying hub 78 secured thereto for rotation therewith.

Seal 79 is interposed between rotatable hub 78 and sleeve 67. There is an additional seal 80 within hub 78 at the outer end of bushing 77. Collar 81 is secured to shaft 49 by set screw 82 and loosely registers with hub 78.

Hub 78 in the manner hereafter described provides a partial support for a pair of spaced longitudinally extending spirally shaped mixing blades, generally indicated at 86.

A pair of oppositely arranged elongated rods 83 and 84 are joined to hub 78 as by the welds 85 providing one of the end supports for outer blades 86. The opposite ends of spiral blades 86 are supported and journaled by the hub 87 which is loosely journaled upon shaft 49 as in Figs. 2, 8 and 9, said hub bearing against the internal hub 74' projecting from reinforcing plate 73 on end wall 69. Collar 88 is secured at 89 upon shaft 49 and loosely bears against hub 87 for maintaining spiral blades 86 against longitudinal displacement.

Rods or supports 90 and 91 project radially outward from opposite sides of hub 87, being secured thereto at their inner ends and lying in a plane substantially at right angles to a plane passing through the first pair of blade supporting rods 83 and 84.

The said spiral blades above, generally described as 86, include the elongated spiral blade element 92, which as shown in Fig. 2, terminates at one end in the radial mounting plate 93 which is supportably secured as by welding at 94 to the rod or spoke 83, said plate 93 lying in the same vertical contour as adjacent portions of blade 92, and extending to hub 78 in a radial direction.

Blade element 92 has a converging outer elongated edge 95, which is adapted for cooperative closely adjacent sweeping relation throughout substantially the inner surface 96 of the semi-circularly shaped portion of the tank as at 71.

Figure 6:
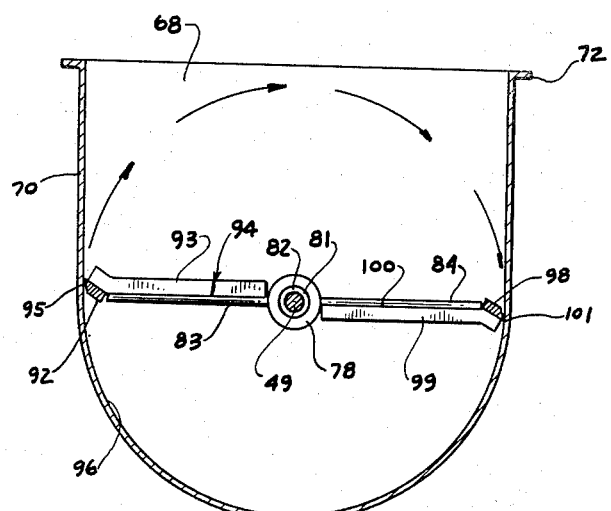
Fig. 6 is a section taken on line 6—6 of Fig. 2.
Figure 7:
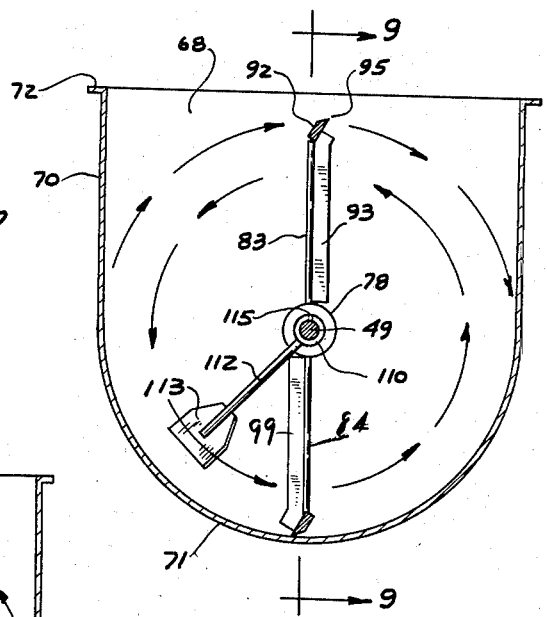
Fig. 7 is a section taken on line 7—7 of Fig. 2.
Figure 8:
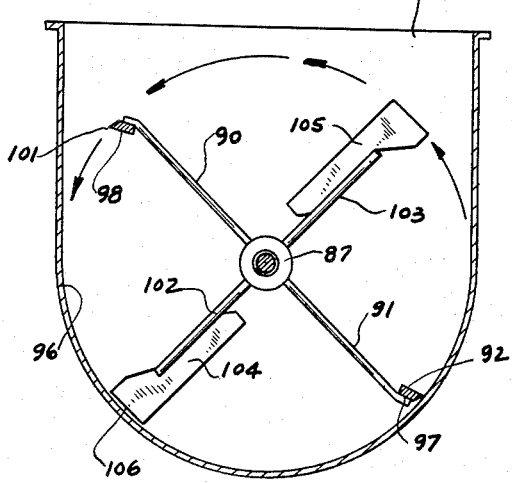
Fig. 8 is a section taken on line 8—8 of Fig. 2.

As shown in Fig. 8, the opposite end of blade element 92 is secured to the outer end of spoke 91 as at 97, as by welding to thereby provide a rigid mounting. There is provided a second oppositely arranged elongated spirally shaped blade element 98 within said tank and which includes at one end of the radial inwardly extending mounting plate 99 secured along an inner upright edge at 100, Fig. 6, to spoke 84. The opposite end of blade element 98 is secured to the outer end of spoke 90 as by welding and as shown in Figs. 2 and 8, said blade also conforming to and is adapted for closely adjacent sweeping relation with the interior wall of the tank. Spiral blade element 98 also is tapered throughout its length as at 101.

Thus, there has been described the generally indicated spiral blades 86 mounted upon the two hubs 78 and 87 and driven by tube 58 for movement in one direction.

Upon hub 87 there is additionally secured a second set of radially directed spokes or rods 102 and 103 arranged at right angles to spokes 90 and 91 but lying in substantially the same vertical plane. As shown in Figs. 2 and 8 the flat paddle blades 104 and 105 of general rectangular shape are secured throughout their length to the spokes 102 and 103 respectively, the opposite outer edges 106 of said blades being in close sweeping engagement with the arcuate interior surface portion of the hopper as best illustrated in Fig. 8.

Furthermore as shown in Fig. 9, the outer radial edges 107 of the blades 104 and 105 are parallel to and in close sweeping relation with the inner wall 69 of the tank. Further the blades 104 and 105 are angularly related, i. e. lying in planes at an acute angle to each other.

Blade 104 is at an angle opposite to the general angle of blade 92. Blade 105 is at an angle opposite to the general angle of spiral blade 98. This construction is essential because while the spiral blades serve to move the material towards the right end of the tank shown in Fig. 9, the blades 104 and 105 are adapted to so impinge upon the material as to reverse its direction of movement moving the same towards the left end of the tank or hopper.

Referring to Fig. 9, the supporting plates 93 and 99 at the one ends of blade element 92 and 98 are constructed so that their outer edge portions 109 which merge with the spiral blade elements are closely adjacent the inner curved surface of the hopper. Similarly, the outer upright radial edges 108 of plates 93 and 99 are spaced closely adjacent the iner surface of end wall 68.

Within the hopper and mounted upon power rotated shaft 49 there is provided another set of paddle blades which are adapted for simultaneous rotation in the opposite direction as the spiral blades 86.

Collar 110 is secured by set screw 115 to shaft 49, and radially directed therefrom is support 112 in the form of a rod upon which is mounted towards its outer end the angularly supported flat blade 113, said blade lying in a plane at an acute angle to a plane passing through shaft 49. Collar 110 is spaced inwardly of collar 81 as shown in Fig. 2.

There is a second collar 114 with set screw 115 secured to a central portion of shaft 49, and radially projecting therefrom is a rod 116 to the outer end of which is immovably secured paddle blade 117, which blade also lies in a plane at an acute angle to a plane passing through shaft 49. There is provided, for illustration, a third collar 118 with set screw 115 also immovably secured to shaft 49. Radially projecting from said collar is another support or rod 119 to the outer end of which is secured a third paddle blade 120, which blade lies in a plane at an acute angle to a plane passing through shaft 49.

Referring to Fig. 2, the three supporting rods 112, 116 and 119 are arranged in circularly spaced relation being approximately 120 degrees with respect to an adjacent blade, so that the three blades are spaced equally throughout 360 degrees.

In the manner above described, shaft 49 rotates in an opposite direction from the rotation of spiral blade actuating tube 58 and consequently the three paddle blades 113, 117 and 120 rotate in unison with the outer spiral blades 86 but in an opposite direction in the space 121 between spiral blade elements 92 and 98.

Crank handle 122 projects through the upper end portion of one of legs 12, being rotatable therein and upon the inner end of said crank there is an angularly arranged locking key 123 adapted for selective positioning within one of the slots 124 formed in end plate flange 65 whereby the hopper of Fig. 1 may be retained in the upright position shown or, upon release of crank 122 and key 123, in the position shown in Fig. 2 and locked in such position to thereby facilitate withdrawal of the mixed food or to provide for a more convenient inspection thereof, said food particles to be mixed, such as chopped meat being generally indicated at 125 in Fig. 9.

The operation of the present food mixer is diagrammatically shown by the arrows 126 and 127 of Fig. 9.

The present simultaneous reverse operation of the inner set of paddles with respect to the spiral blades accomplishes a very efficient mixing of the food elements 125. The action of the spirally shaped blades including supporting blades 93 and 99 is to force the contents within the hopper to the right of Fig. 9 as indicated by arrow 126. The inner paddles 113, 117 and 120 as well as end paddles 104 and 105 are adapted to force the contents of the hopper to the left as indicated by arrow 127 to thereby achieve an effective mixing. Thus the material to be mixed is first moved towards one end of the hopper and in a continuous operation is returned to the opposite end. This means furthermore that the mixed material may be moving in two directions at the same time to thereby obtain a homogeneous mixing of the various food elements, such as chopped meat or other foods.

Referring to Fig. 9 and viewing the machine from the right end of this figure, the outer spiral blades 92 and 98 are rotating in a clockwise direction causing particles of the material 125 to be moved to the right as indicated by arrows 126. Blades 104 and 105, while rotating in unison with said spiral blades are arranged at reverse angles respectively to thereby reverse the direction of movement of the material being mixed towards the left end of the tank as indicated by the arrows 127. At the same time the inner paddles 113, 117 and 120 are rotating in a counter-clockwise direction, viewing the machine from its right end for additionally and continuously moving the material towards the left end of the tank or hopper. At the left end of the tank the material impinges against the oppositely rotating blades 93 and 99 which redirect the material again towards the right end of the tank as shown by arrows 126.

Thus during the mixing operation of the chopped meat particles or other elements there is a continuous movement of the material as indicated by the arrows 126 and 127, with most of the movement being below shaft 49.

In the preferred embodiment of the present invention and in view of the gear relationship within the gear casing, the spiral blades rotate at approximately 26 R. P. M., whereas the inner paddles rotate at approximately 24 R. P. M. It is contemplated that by changing the gears or varying them at any time relative speeds may be accordingly varied.

Having described my invention, reference should now be had to the claim which follows for determining the scope thereof.

I claim:

A mixing machine comprising an upright frame, a hopper open at the top mounted upon said frame a power driven gear box mounted on the frame at one end of the hopper, a power driven shaft journaled into the gear box and journaled through said hopper and rotatable in one direction, a plurality of longitudinally spaced radially directed paddle blades secured to said shaft in circularly spaced relation around its circumference and lying in angularly related planes at acute angles to the shaft axis, a power driven tube journaled into said gear box projected into said hopper journaled on said shaft and rotatable in the opposite direction, a pair of spaced diametrically opposed spirally shaped elongated blades with all portions thereof arranged at a fixed radius with respect to said shaft greater than the radial length of said paddle blades and in close sweeping relation with the side and bottom walls of the hopper throughout their length, whereby the material to be mixed within said hopper is longitudinally directed first in one direction then in the other direction throughout the length of said hopper during simultaneous rotation in opposite directions of said paddle blades and spirally shaped blades, a hub secured to said tube adjacent the one ends of the spiral blades, a second hub adjacent the other ends of said spiral blades journaled on the shaft, a pair of oppositely arranged radial supports joined at their inner ends to said first hub and at their outer ends to the one ends of said spiral blades, a second pair of radial supports arranged at substantially right angles to the first pair of supports secured at their inner ends to said second hub and at their outer ends to the other ends of said spiral blades, said hopper having a pair of upright end walls, a third pair of oppositely arranged radial supports joined at their inner ends to said second hub at right angles to said second pair of supports, a pair of oppositely directed substantially flat radial plates secured to said third pair of radial supports with their outer radial edges adapted for close sweeping relation with an adjacent end wall, and with their outer longitudinal edges adapted for close sweeping relation with the interior curved portion of said hopper, said plates lying in angularly related planes at complemental acute angles to the shaft axis for reversing at an adjacent end of said hopper the direction of longitudinal movement of material being mixed therein and a second pair of opposed substantially flat radial plates at the one ends of said spiral blades joined to said first pair of supports and extending to said first hub, said second pair of plates at their outer longitudinal edges corresponding to the curvature of and merging with the said one ends of said spiral blades forming radial extensions thereof, the radial outer edges of said second pair of plates lying in close sweeping relation with an adjacent wall, said second pair of plates lying in acute angularly related planes at complemental acute angles to the shaft axis for again reversing at the adjacent end of said hopper the direction of longitudinal movement of the material being mixed.

References Cited in the file of this patent

UNITED STATES PATENTS

| 31,806 | Hopkins | Mar. 26, 1861 |
| 445,204 | Sacco | Jan. 27, 1891 |
| 540,962 | Duhrkop | June 11, 1895 |
| 713,088 | Friedrick | Nov. 11, 1902 |
| 952,031 | Dickson | Mar. 15, 1910 |
| 1,540,547 | Doidge | June 2, 1925 |
| 2,118,500 | Ferenci | May 24, 1938 |
| 2,552,023 | Andersen | May 8, 1951 |

FOREIGN PATENTS

| 184,433 | Great Britain | Aug. 1, 1922 |